United States Patent

Aaron et al.

[11] Patent Number: 5,918,892
[45] Date of Patent: Jul. 6, 1999

[54] FASTENING DEVICE FOR CONNECTING CHILDREN'S STROLLERS

[76] Inventors: Christine Aaron, 100 W. Garden Rd., Larchmont, N.Y. 10538; Virginia Ellis, 66 Glen Oaks Dr., Rye, N.Y. 10580

[21] Appl. No.: 08/712,849

[22] Filed: Sep. 12, 1996

[51] Int. Cl.$^6$ ..................................................... B62B 7/00
[52] U.S. Cl. .................................. 280/47.38; 280/47.35; 280/209; 403/188
[58] Field of Search ............................. 280/47.38, 47.35, 280/203, 204, 209, 647, 658; 403/188, 389, 391

[56] References Cited

U.S. PATENT DOCUMENTS

| | | | |
|---|---|---|---|
| 461,069 | 10/1891 | Caspar | 24/335 |
| 1,000,046 | 8/1911 | Stafford | 403/188 |
| 1,352,647 | 9/1920 | Benton | 403/188 |
| 1,688,148 | 10/1928 | Martin | 403/188 |
| 1,934,396 | 11/1933 | Bales | 403/188 X |
| 3,989,173 | 11/1976 | Gebhard | 224/6 |
| 4,805,938 | 2/1989 | Redmond et al. | 280/47.35 |
| 5,522,121 | 6/1996 | Fraynd et al. | 280/658 X |
| 5,669,731 | 9/1997 | Hironaka et al. | 403/405.1 |

Primary Examiner—Robert J. Oberleitner
Assistant Examiner—Pamela J. Lipka
Attorney, Agent, or Firm—Dorsey & Whitney LLP

[57] ABSTRACT

A device for use in conjunction with strollers for securely connecting single strollers together, allowing two or more children, to be safely and effectively transported. The stroller connecting device(s) are easily detachable. The apparatus comprises an adjustable supporting member with a clamping, or other fastening, mechanism at each end. The clamping mechanisms, generally, have two jaws, rotatably connected to one another to grasp and lock a stroller shaft. The fastening mechanism preferably fastens securely onto the shafts of the strollers, providing stable operation during movement. Each jaw, of the fastening mechanism, receives and firmly grasps one shaft of the stroller. The support is preferably comprised of two tubes, with the relative position of the tubes to one another being adjustable, and thus, allowing the distance from one stroller to the other to be variable. Together, the supporting member and fastening mechanisms allow the connecting apparatus to securely, safely and rigidly connect two or more strollers. The stroller connecting devices are generally placed in two of three locations on the shafts of each stroller. Usually, two connecting devices are sufficient to provide the necessary control and stability.

3 Claims, 9 Drawing Sheets

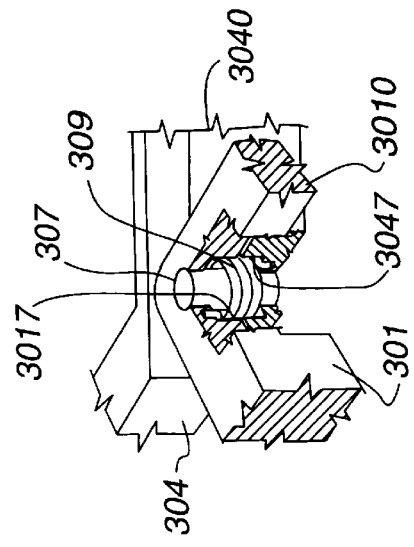
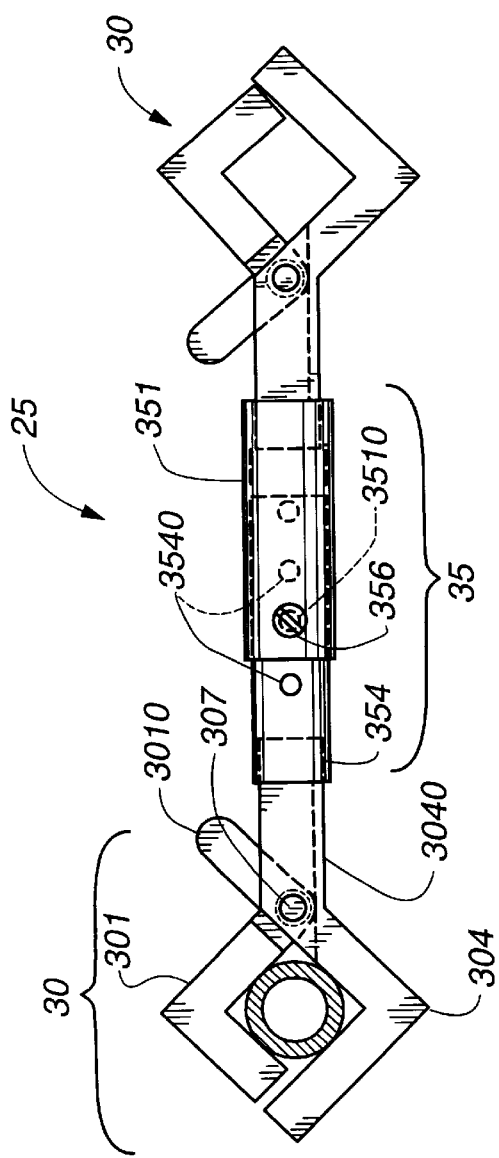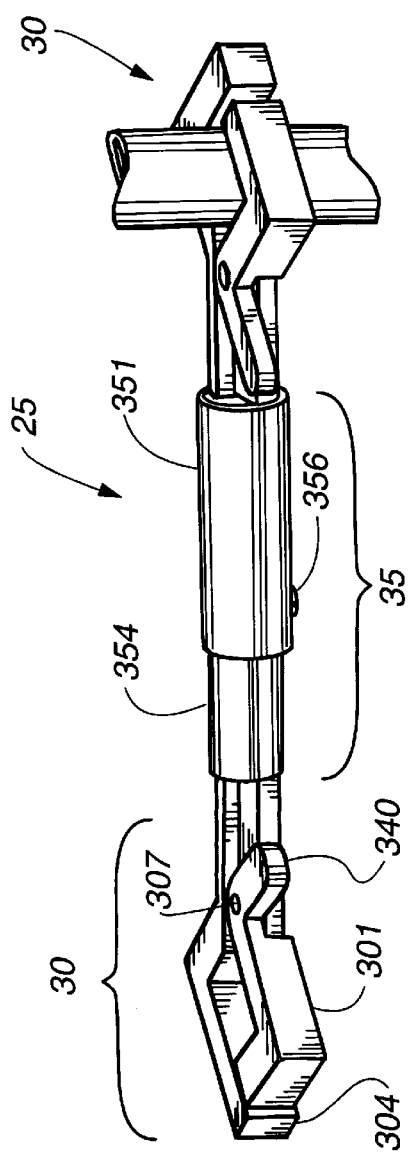
Fig. 3c
Fig. 3a
Fig. 3b

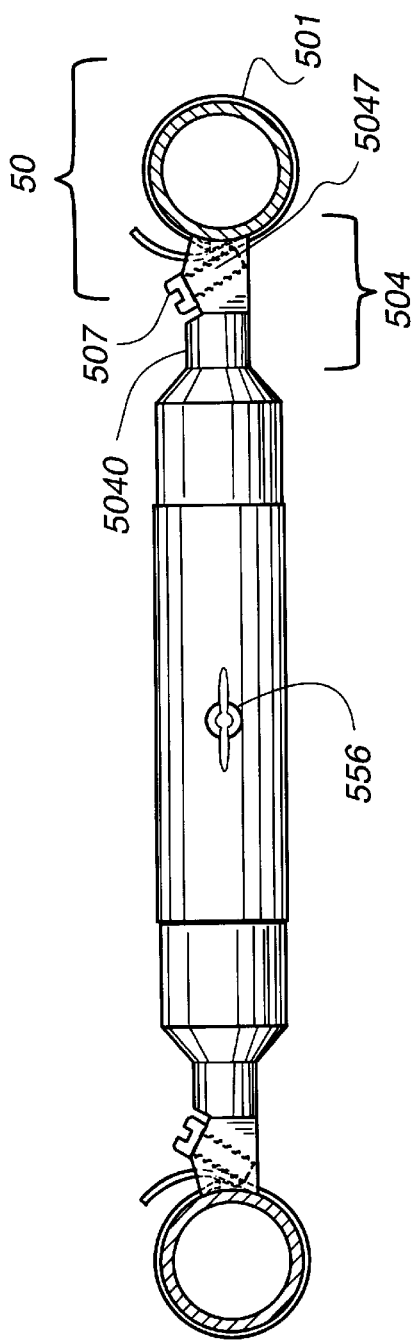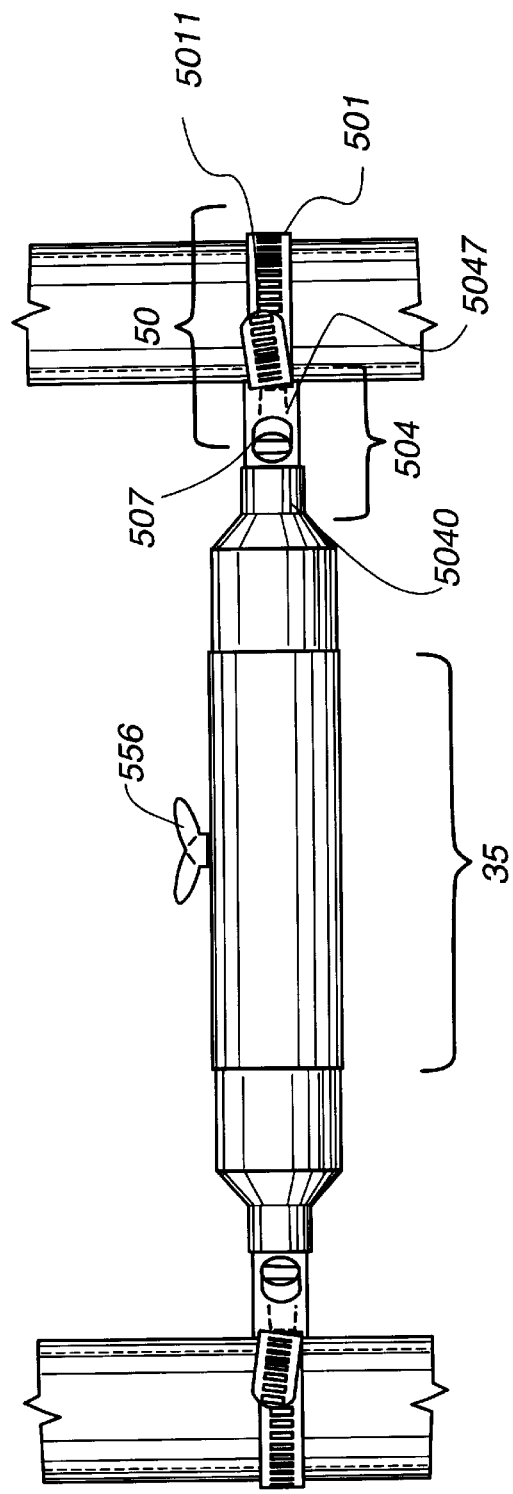
Fig. 6a
Fig. 6b

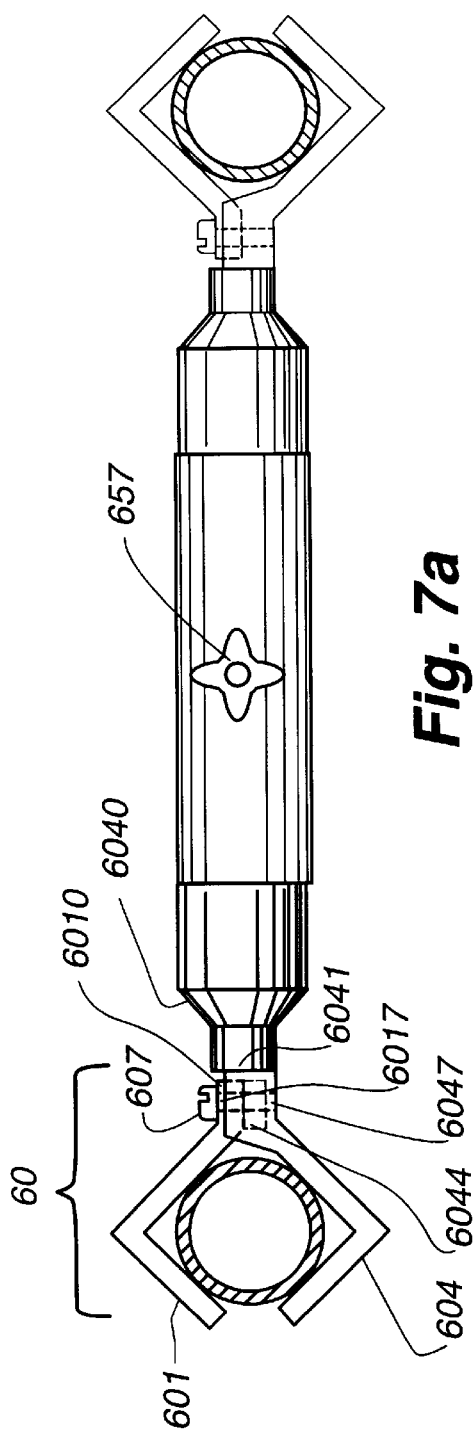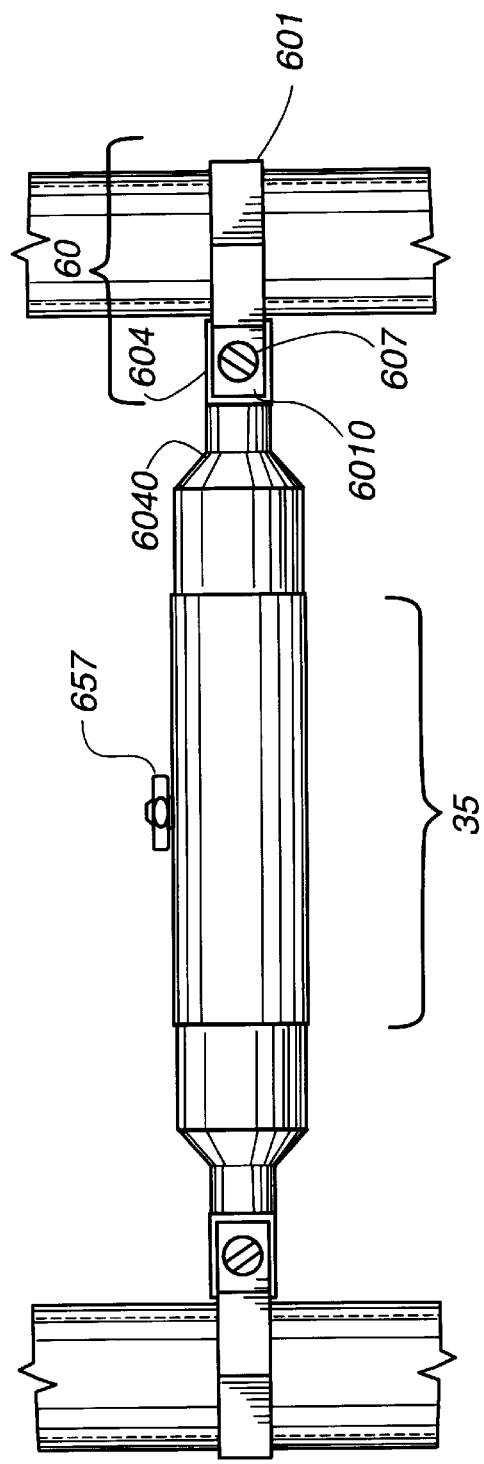
Fig. 7a
Fig. 7b

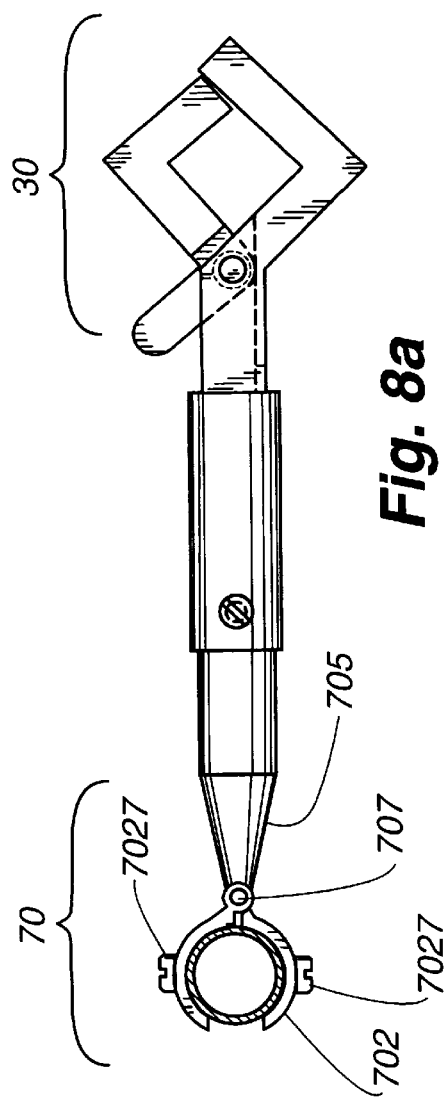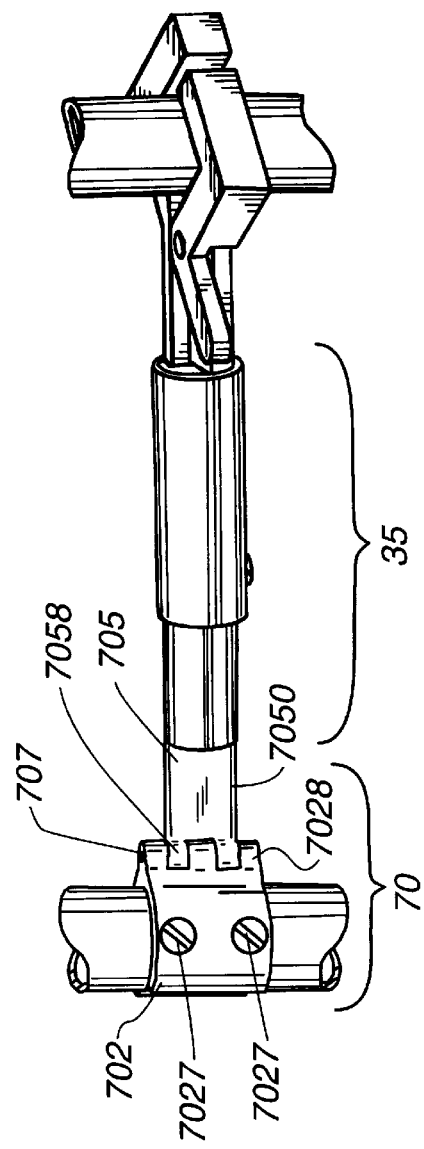

FASTENING DEVICE FOR CONNECTING CHILDREN'S STROLLERS

BACKGROUND

Strollers have become essential for use in the transportation of children. Stroller designs have proliferated, resulting in more ergonomical, stable and less bulky alternatives. A problem, however, remains with meeting the needs of parents or guardians of multiple children. With two or more children, for example, more than a single stroller is necessary. Many parents with multiple children have two or more single strollers, but it is impossible for one person to safely push and control multiple single strollers simultaneously.

The stroller industry's attempted solution has been to offer the double-stroller. However, while ideally suited for carrying two children of approximately the same size, it does not sufficiently address the needs in several other situations. For example, the double stroller is expensive and wasteful for a person with a single child who only irregularly takes care of another child, considering that the double stroller is unnecessary most of the time in such circumstances. Further, double strollers are awkward to push and control when transporting a single child, given the resulting off-balance alignment in such a situation.

For people responsible for two children, a disadvantage of a double stroller is that it does not offer the flexibility of single strollers. Many times, two adults, for example, desire to separate and travel to different locations with each adult accompanying one child. This, of course, is impossible with a double-stroller, since it is a inseparable monolithic unit.

Because of the above and other disadvantages of prior art strollers, parents are often left with no choice but to purchase both a single and double stroller. Some parents even find it necessary to purchase two single strollers as well as a double stroller to cover all their needs.

Therefore, what is needed is a device that maintains the flexibility of single-strollers, while providing the safety and control of double-strollers, at a reduced cost. What is needed is a device that safely connects two single strollers together, yet is releasable so that the strollers are usable separately.

SUMMARY OF INVENTION

The present invention is a device for securely connecting single strollers together, allowing two or more children, to be safely and effectively transported without any appreciable degradation in the maneuverability or control of either single stroller. Further, the stroller connecting device(s) are easily detachable from the strollers, thereby facilitating separation of the strollers for single use.

The device of the present invention comprises an adjustable supporting member with a clamping, or other fastening, mechanism at each end. The clamping mechanisms, generally, have two jaws, rotatably connected to one another to grasp and lock a stroller shaft. The fastening mechanism preferably fastens securely onto the shafts of the strollers, providing stable operation during movement. Each jaw, of the fastening mechanism, receives and firmly grasps one shaft of the stroller. Preferably, the jaws are covered with a plastic or rubber sleeve so as to prevent sliding of the fastening mechanism along the stroller shaft.

Because the support member is adjustable, the strollers can be kept at a desired distance apart. The support is preferably comprised of two tubes, with the relative position of the tubes to one another being adjustable, and thus, allowing the distance from one stroller to the other to be variable. This feature also allows for the proper alignment of the strollers. The support member is of sufficient rigidity to provide stable operation of the stroller configuration. Together, the supporting member and fastening mechanisms allow the connecting apparatus to securely, safely and rigidly connect two or more strollers.

The stroller connecting devices are generally placed in two of three locations on the shafts of each stroller. Usually, two connecting devices are sufficient to provide the necessary control and stability. In certain situations, however, it may be preferable to use three or more connecting devices to enhance the control and stability of the stroller configuration.

The stroller connecting devices of the present invention allow one person to safely push and control two single strollers simultaneously. Furthermore, the present invention provides for easy detachment of multiple single strollers with minimal effort.

Therefore, the stroller connecting device of the present invention provides the flexibility of single strollers, while facilitating the safety and control of a double-stroller at a reduced cost.

One object of this invention is to allow the secure, stable and safe attachment of two separate strollers while maintaining the maneuverability of a single stroller.

Another object of this invention is to allow one person to easily and safely push two or more single strollers at the same time.

DESCRIPTION OF THE DRAWINGS

FIGS. 3a and 3b are an overhead view and a side view, respectively, of a preferred stroller connecting device with a spring clamp, comprising two jaws rotatably connected to one another, attached at each end of an adjustable support member.

FIG. 3c is a cross-sectional view of the rotatable connection of the two jaws of the spring clamp.

FIGS. 6a and 6b are an overhead view and a side view, respectively, of the stroller connecting device with adjustable support member and with belt clamps, located at each end of the support member, as the fastening mechanisms.

FIGS. 7a and 7b are an overhead view and a side view, respectively, of the stroller connecting device with the adjustable support member using two screwing clamps, each of which comprises two screwably connected jaws, as the fastening mechanisms.

FIGS. 8a and 8b are an overhead view and a side view, respectively, of the connecting device using a hinge clamp.

DETAILED DESCRIPTION OF THE INVENTION

Figure 1:
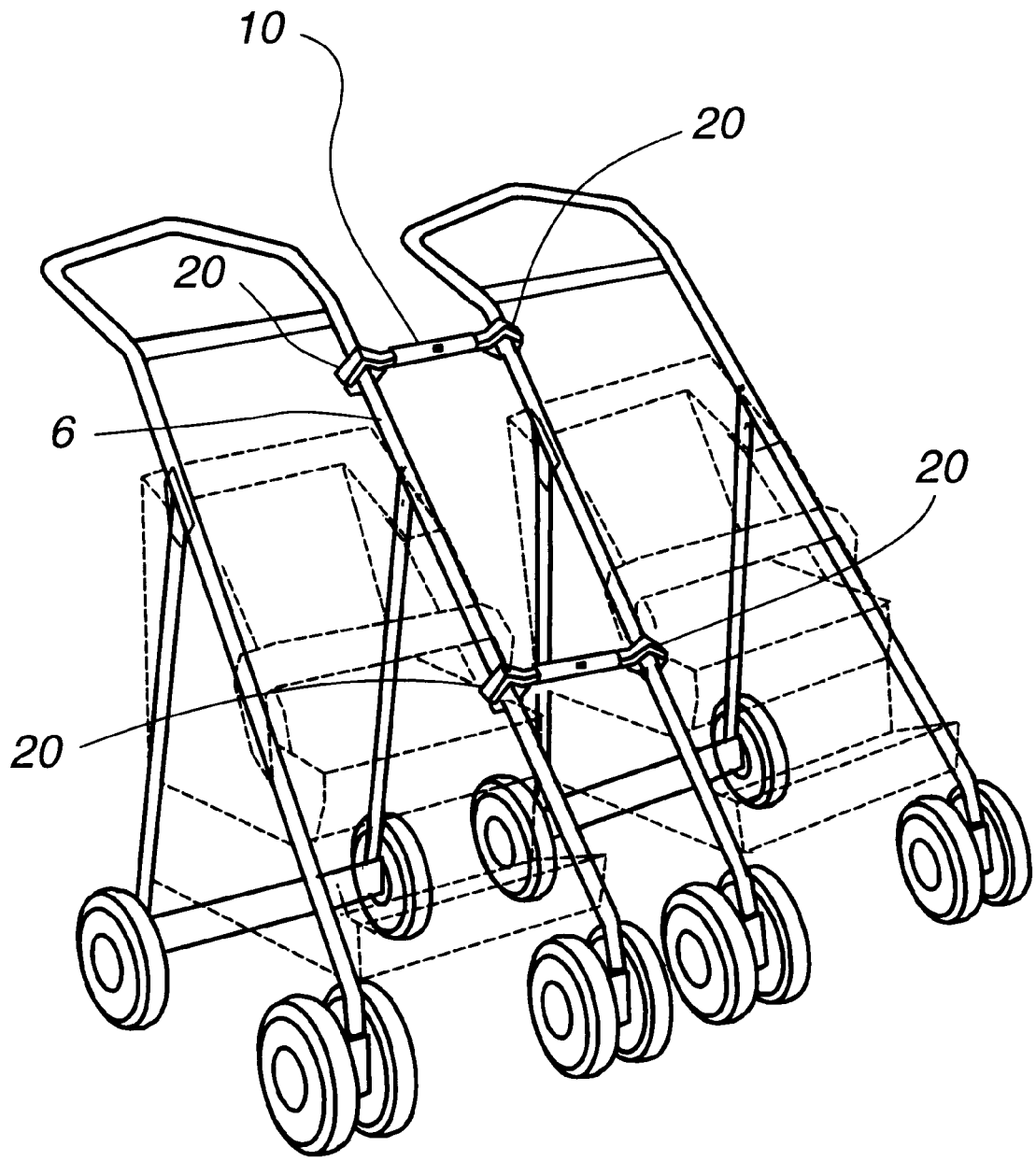
FIG. 1 is a perspective view of two stroller connecting devices of the present invention used in tandem on two strollers.
Figure 2:
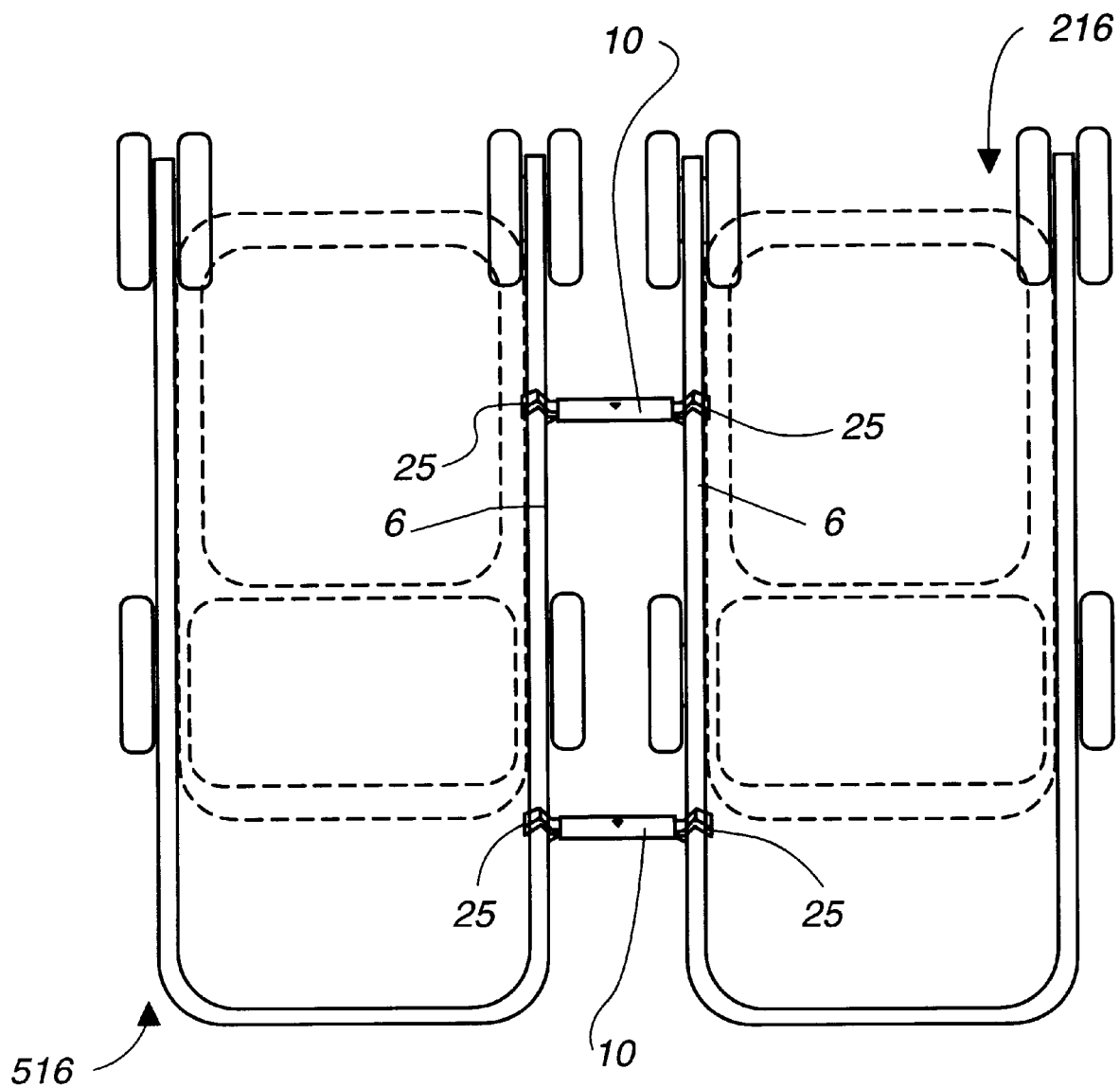
FIG. 2 is an overhead view of two stroller connecting devices, both of which are connected to the upper support shafts of two strollers.

In a preferred embodiment, two or more strollers are joined by a connecting device(s) comprising a support member 10 with fastening mechanisms 20 attached at each end, as shown in FIG. 1. FIGS. 1 and 2 show a perspective view and top view of this embodiment, respectively, with two stroller connecting devices attached on the upper support shafts 6 of the strollers. However, these devices can also be positioned to join the stroller side shafts 10 and/or the upper support shafts 6 of the strollers. Further, although only two stroller connecting devices are shown in FIGS. 1 and 2, additional connecting devices may be added for enhanced control and stability, although, in most circumstances, two or three are generally sufficient.

The stroller connecting device comprises a support member 35, with a fastening mechanism 30 attached at each end. One such preferred embodiment is shown in FIGS. 3a and 3b, providing an overhead and side view, respectively. In this configuration, the device 25 has two spring clamps 30 which are connected at opposite ends of an adjustable support member 35.

Each spring clamp 30 comprises an upper jaw 301, a lower jaw 304, a rod 307, and a spring 309, as shown in FIGS. 3a and 3b. The upper jaw 301 is biased towards the lower jaw 304 so that it clamps tightly around the shaft of the stroller. The spring clamps 30 open to receive, grasp and lock the shaft, or other suitable portion, of the stroller. Preferably, the jaws are covered with a plastic or rubber sleeve so as to prevent sliding of the fastening mechanism along the stroller shaft.

The clamps 30 are fastened to the desired shafts of the stroller, as follows: the clamps are opened by applying sufficient pressure on the upper jaw handle 3010 in the direction of the support member 35; the shaft portion is positioned within the opening formed between the inner surfaces of the two jaws 301, 304; the pressure on the upper jaw handle 3010 and the support member 35 is released, thereby closing the jaws securely around the shaft portion. Pressure can be provided by squeezing the inner end 3010 with one's hand. The clamps 30 can be easily opened, thus removing the connecting device 25 from the stroller, by applying pressure on the top portion of the upper jaw handle 3010 in the direction of the support member 35. to open the jaws such that the opening created at the jaw ends is sufficient to pass the shaft through.

Referring to FIGS. 3a and 3b, the lower jaw 304 is preferably connected to the support 35 at its inner end 3040 so that its position is fixed relative to the support 35. This connection may be achieved numerous ways, for example, with threaded ends, cemented ends, welded ends, or locking ends. The fixed position of the lower jaw 304 allows it to receive and hold the shaft of the stroller while the biased upper jaw 301 tightly clamps down around the shaft.

Both jaws 301, 304 preferably have a pivot point about which both jaws rotate to form a secure lock around the shaft. The pivot point is preferably formed by aligning the cylindrical voids 3017, 3047 of the upper and lower jaws, 301, 304, respectively, inserting a rod 307 therebetween, and clamping an end of the rod to hold it in position. The rod 307 provides the pivot point that the upper jaw 301 moves around when it is biased away from and towards the lower jaw 304. Likewise, the positioning of the rod 307 precisely aligns the upper and lower jaw 304. This alignment thereby allows the jaws 301, 304 to squarely clamp and receive the shaft of the stroller.

The spring 309 is wound around the rod 307 so as to apply the rotational force on the upper jaw 301, as shown in FIG. 3c. This rotational force biases the upper jaw 301 towards the lower jaw 304. It is this bias that causes the upper jaw 301 to tightly clamp down around the shaft of the stroller, resulting in a secure clamp around the shaft. Preferably, the spring 309 is wound to a sufficient tension to result in a tight connection for small, as well as, large stroller shafts. The tension, however, is not too strong so as to inhibit easy opening of the jaws 301, 304.

The support 35 serves many functions in the stroller connecting device 25. One function is to align and firmly support the opposing clamps. The support 35, when aligned and adjusted with the supports on any other connecting devices, if required, keeps the wheels of the strollers parallel so that the strollers move symmetrically together. Another function of the support member 25 is to control and adjust the spacing of the strollers. At a minimum, the spacing must be sufficient to ensure that the wheels of one stroller are kept apart from those of the other stroller. Furthermore, the spacing must be comfortable for the person pushing the connected strollers. Therefore, the support 35 must be adjustable and rigid.

To provide these functions, an adjustable support 35 is preferred, comprising an outer tube 351, an inner tube 354, and a metal screw 356, as shown in FIGS. 3a and 3b. Preferably, the metal screw has a large plastic-coated head containing finger indentions for grip. The device is constructed with two tubes to allow the connecting device to be adjustable. This adjustability is one of the many important features of this invention. The outer tube 351 has a interior cylindrical passageway within which the inner tube 354 is disposed. While the outer tube 351 is hollow, it is of sufficient thickness and constructed of appropriate material to minimize wear. The outer tube 351 also has an opening 3510 through which the metal screw is inserted, as described below. Lastly, the outer tube 351 is connected to one of the spring clamps 30, in the manner mentioned above.

The inner tube 354 has a smaller diameter than the outer tube 351, and thus, is slidably disposed and movable within the outer tube 351. The inner tube 354 is solid, with the exception of numerous openings 3540 juxtaposed along its axis. The inner tube 354 provides much of the rigidity and strength of the support 35. The inner tube 354 is also connected with one of the spring clamps 30, opposite to that clamp connected to the outer tube 351.

The length of the device is determined by aligning the opening 3510 in the outer tube 351 with one of the openings 3540 in the inner tube 354 and positioning the screw 356 through both openings. The length of the device is adjusted by loosening the screw 356 and sliding the inner tube 354 until the opening 3510 of the outer tube 351 is aligned with a different opening 3540 of the inner tube 354. The screw 356 is then tightened through the "new" opening. The length of the device, and thus, the spacing of the strollers is thereby adjusted.

Figure 4:
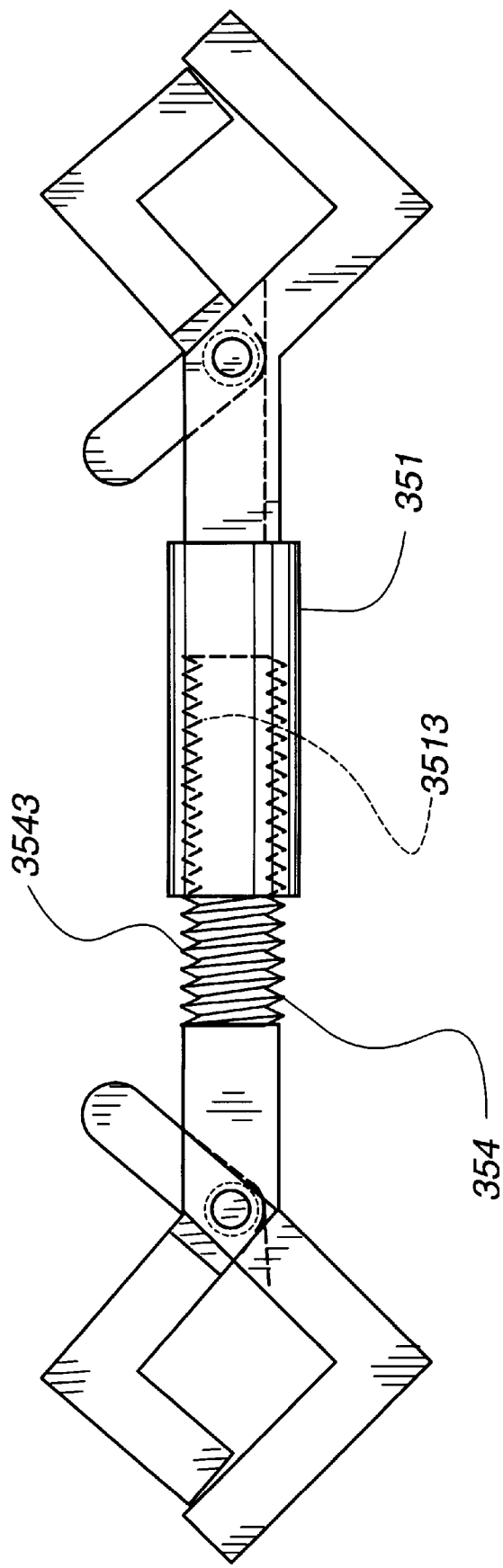
FIG. 4 is an overhead view of the stroller connecting device using the spring clamps, with the two tubes of the support member screwably connected to offer adjustability.

An alternative embodiment of an adjustable support member is shown in FIG. 4. In this embodiment, the inner tube 354 is screwably positioned into the outer tube 351. The inner tube 354 has male threading 3543 on its exterior surface while the outer tube 351 has female threading 3513 on its interior surface. As the inner tube 354 is screwed further into the outer tube 351, the overall length of the support member, and thus, the connecting device is reduced. The thread depth and width are of such dimensions to ensure a rigid connection regardless of how far within the outer tube 351 the inner tube 354 is positioned.

Figure 5:
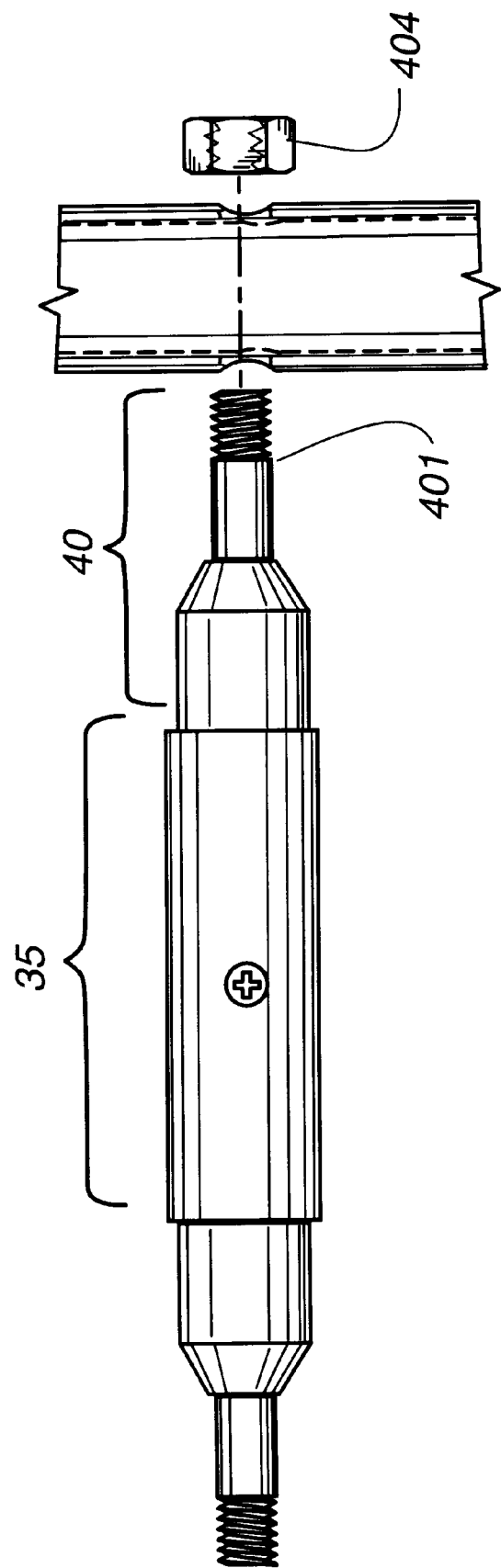
FIGS. 5 is a side view of a stroller connecting device using two partially threaded ends on the support member and nuts as the fastening mechanisms.

There also exist different preferred embodiments for the fastening mechanisms. In the embodiment shown in FIG. 5, the fastening mechanism comprises threaded ends 401 on the ends of the support member 35 which when inserted through holes in the shafts are secured by corresponding threaded nuts 404. The threaded nuts 404 are tightened around the threaded ends 401 that extend beyond the shaft. In this embodiment, openings are drilled through the shafts of the strollers. The opposing holes in each stroller are preferably set at the same height above ground so that the stroller connecting devices are level. The nuts 401 must be tightened sufficiently enough to securely connect the device to the strollers.

Another preferred embodiment of the fastening mechanism is shown in FIGS. 6a and 6b. In this embodiment, the fastening means comprise belt clamps 50. The belt clamps 50 preferably comprise a belt 501, a belt receiver 504, and a tightening screw 507. One end of the belt 501 is fixedly attached to the belt receiver 504. The free end of the belt 501 wraps around the shaft of the stroller. The belt 501 loop is completed by threading the free end of the belt 501 through the belt receiver 504. The belt 501 has numerous notches 5011, as shown in FIG. 6b, along its length that correspond with the threading of the tightening screw 507. This correspondence allows the tightening screw 507 to tighten and loosen the belt 501, as well as securely fasten the belt in place. Thus, the belt clamp 50 receives the shaft of the stroller within its belt loop, and when tightened, securely fastens to the stroller shaft.

The belt receiver 504 receives the free end of the belt 501 through its opening. The inner end 5040 of the receiver is connected to the support 35 according to any of the connections discussed above. The belt receiver 504 has a slanted cylindrical shaft 5047 through which the tightening screw 507 is screwably disposed. The cylindrical shaft 5047 is juxtaposed about the belt 501 so that the threads of the tightening screw 507 align with the notches 5011 of the belt 501. Positioned as such, turning the tightening screw 507 clockwise tightens the belt 501, thereby more securely attaching the connecting device to the stroller shaft. Alternatively, loosening the tightening screw 507 allows the belt 501 to open up, releasing the shaft from the device.

Figure 7C:
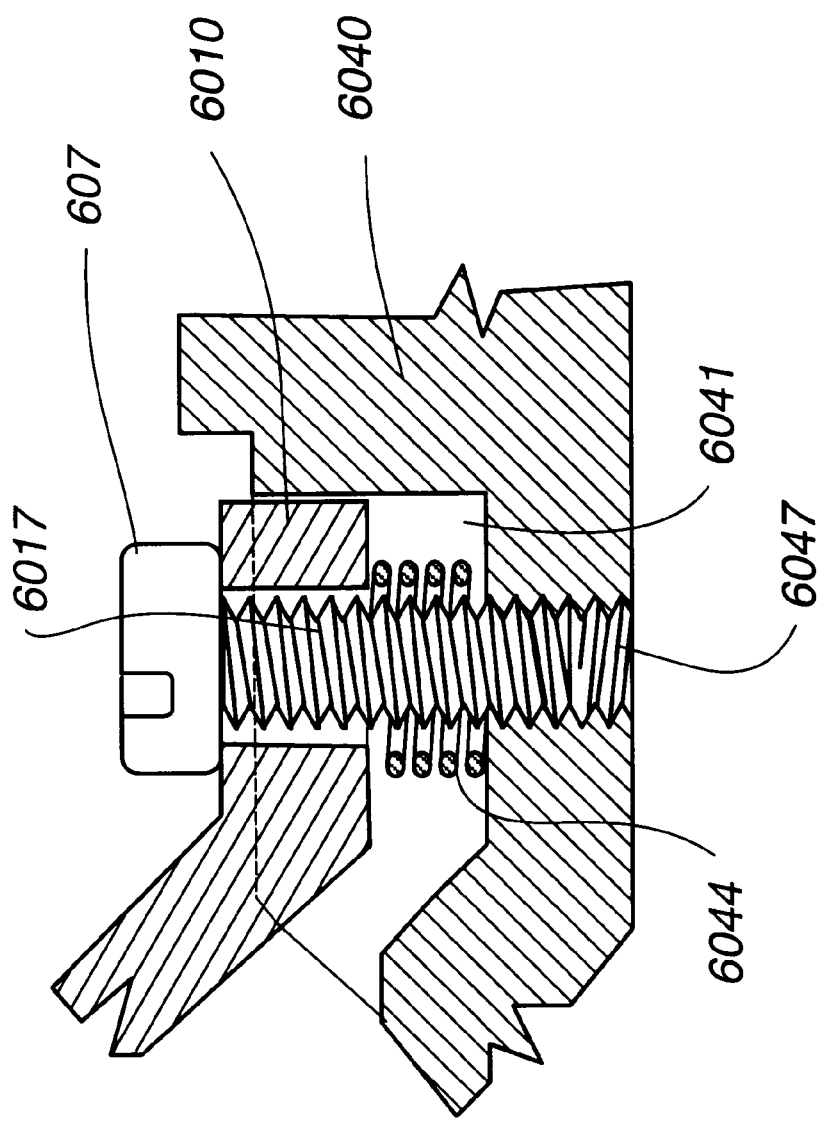
FIG. 7c is a cross-sectional view of the connection of the two jaws of a screwing clamp.

FIGS. 7a, 7b and 7c show another preferred embodiment with two screwing clamps 60 as the fastening mechanism. The screwing clamps 60 are opened to receive the shaft of the stroller. The screwing clamps 60 can be opened by loosening a clamping screw 607 with an appropriate screwdriver. When the clamping screw 607 is tightened, the clamps tightly grasp the shafts of the strollers, thereby securely connecting the two strollers.

In this embodiment, the screwing clamps 60 comprise a lower jaw 604, an upper jaw 601, and a clamping screw 607. The lower jaw 604 receives the shaft of the stroller. As such, it is shaped to securely hold the shaft. Further, it is connected with the support 35 at its inner end 6040, according to any of those possible connections discussed above. The lower jaw 604 has a depression 6041 shaped so that the inner end 6010 of the upper jaw 601 can sit squarely within it, as shown in FIG. 7c.

The upper jaw 601 is shaped so that it will securely clamp around the shaft of the stroller. The upper jaw 601 is raised to allow the lower jaw 604 to receive the shaft of the stroller. Once the shaft has been received, the upper jaw 601 is lowered to securely clamp down around the shaft. These results are achieved by positioning the clamping screw 607 within a cylindrical void 6017 in the upper jaw 601, as shown in FIG. 7c. As the clamping screw 607 is rotated counter-clockwise, the upper jaw 601 is raised. Likewise, when the clamping screw 607 is rotated clockwise, the upper jaw 601 clamps down.

Preferably, the downward pressure of the upper jaw 601, when the clamp 60 is in the closed position, is maintained by a spring 6044. As the clamping screw 607 is tightened, and the inner end 6010 of the upper jaw 601 is forced into a depression 6041 in the lower jaw 604, the spring exerts an upward pressure on the inner end. This upward pressure is met by the clamping screw 607, thereby maintaining the downward pressure on the shaft of the stroller at the level of the clamping screw 607. This allows the screwing clamp 60 to securely and rigidly clamp stroller shaft's of widely varying diameter.

Another preferred embodiment, which has the advantage of a permanent attachment to one of the strollers, is depicted in FIGS. 8a and 8b. This alternative achieves this goal with a hinge clamp 70 attached to one end of the device. The hinge clamp 70 is a semi-permanent connection which, when not in use, conveniently folds up into the stroller. Preferably, the fastening means on the other end of the connecting device is a spring clamp 30, as described above, although any of the other disclosed fastening means may be used in this embodiment.

The hinge clamp 70 is comprised of a hinged clasp 702, a hinged connector 705, and a hinge rod 707. The hinged clasp 702 fastens around the shaft of the stroller. The hinged clasp 702 has four screws 7027, two on each side, that are screwably displaced through the shaft walls of the stroller.

The hinged clasp 702 also has a female hinged portion 7028 that receives the male hinged portion 7058 of the hinged connector 705. This allows the stroller connecting device to swing back into the body of the stroller when it is not in use. The hinged connector 705 is attached to the support 35 at its inner end 7050, thereby joining the hinged clamp 70 with the rest of the connecting device.

Within the male 7058 and female 7028 hinged portions of the hinged clasp 702 and hinged connector 705, the hinge rod 707 is disposed so as to rotatably connect these two sections. This rotatable connection allows the stroller connecting device to pivot about the hinged clasp 702. Since the connecting device must remain stable when in use, the hinge rod 707 contains a locking mechanism that prevents the apparatus from pivoting during such operation.

The foregoing description of the present invention has been presented for purposes of illustration and description. Furthermore, the description is not intended to limit the invention to the forms described. Consequently, variations and modifications commensurate with the above teachings, and within the skill and knowledge of the relevant art, are part of the scope of the present invention.

What is claimed is:

1. A stroller connecting device for securely connecting the shafts of a plurality of strollers together, thereby allowing the strollers to operate in tandem, comprising:

at least one fastening mechanism, adapted to receive a stroller shaft, so as to attach a plurality of strollers together, wherein the fastening mechanism comprises:
a first jaw, with a first and second end, secured to one end of the means for support, wherein the first jaw receives the shaft of the stroller; and
a second jaw, with a first and second end, rotatable connected to the first jaw, wherein the second jaw closes about the shaft received in the first jaw, so as to secure the device to the stroller;
wherein the second ends of the first and the second jaws each have an outer surface, a cylindrical void, and a means for biasing the second jaw towards the first jaw comprising:

a rod disposed within the cylindrical void of the first and second jaws;

a spring attached to the rod; and whereby the application of pressure to the outer surfaces of the second ends of the first and second jaws allows the first end of the second jaw to retreat from the end of the first jaw, thereby allowing the shaft to be removed from the fastening mechanism;

support member having two ends, at least one of the member ends firmly attached to the fastening mechanism; and whereby the support member aliens the fastening mechanism so that the strollers operate cooperatively, and the support member connects the strollers securely to ensure safe operation.

2. A stroller connecting device for securely connecting the shafts of a plurality of strollers together, thereby allowing the strollers to operate in tandem, comprising:

at least one fastening mechanism, adapted to receive a stroller shaft, so as to attach a plurality of strollers together, support member having two ends, at least one of the member ends firmly attached to the fastening mechanism;

wherein the support member is adjustable and comprises:

a first tube having an exterior and interior surface;

a second tube slidably disposed within the first tube, wherein the length of the support member, and hence the spacing between the strollers, is adjusted by changing the position of the tube relative to one another; and a means for fixing the position of both tubes relative to one another, wherein the means for fixing the position comprises:

walls defining an opening through the first tube;

walls defining a plurality of openings through the second tube;

and a screw, positioned within the opening, wherein the screw is advanced towards the second tube to fix the position of both tubes relative to one another; and whereby the support member aligns the fastening mechanism so that the strollers operate cooperatively, and the support member connects the strollers securely to ensure safe operation.

3. A stroller connecting device for securely connecting the shafts of a plurality of strollers together, thereby allowing the strollers to operate in tandem, comprising:

a support member having two ends, comprising:

a first tube having an exterior and interior surface with walls defining an opening through the surfaces;

a second tube, wherein the second tube is slidably disposed within the first tube;

and a screw, positioned within the opening, wherein the screw is advanced towards the second tube to fix the position of both tubes relative to one another, thereby resulting in an adjustable support member; and at least one clamping mechanism, adapted to receive a stroller shaft, so as to attach a plurality of strollers together;

a first jaw secured to one end of the support member, the first jaw having a first and second end, the second end having a cylindrical void;

a second jaw, rotatably connected to the first jaw, having a cylindrical void; and a means for moving said second jaw towards said first jaw, comprising a rod disposed within the cylindrical voids of the first and second jaws, and a spring, connected to the inner surface of the first and second jaws, wherein the application of pressure to the outer surface of the second ends of the jaws allows the first end of the second jaw to retreat from the first end of the first jaw.

\* \* \* \* \*